(12) United States Patent
Kim

(10) Patent No.: US 12,476,270 B1
(45) Date of Patent: Nov. 18, 2025

(54) APPARATUS FOR MANUFACTURING A CELL STACK FOR A SECONDARY BATTERY HAVING CLAMPING UNIT

(71) Applicant: Woowon Technology Co., Ltd, Gyeonggi-do (KR)

(72) Inventor: Tae Wan Kim, Gyeonggi-do (KR)

(73) Assignee: WOOWON TECHNOLOGY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/182,903

(22) Filed: Apr. 18, 2025

(51) Int. Cl.
*H01M 10/04* (2006.01)

(52) U.S. Cl.
CPC ... *H01M 10/0404* (2013.01); *H01M 10/0468* (2013.01); *H01M 10/0459* (2013.01); *H01M 10/0463* (2013.01); *Y02E 60/10* (2013.01); *Y02P 70/50* (2015.11)

(58) Field of Classification Search
CPC ......... H01M 10/0404; H01M 10/0459; H01M 10/0463; H01M 10/0468; Y02E 60/10; Y02P 70/50
See application file for complete search history.

(56) References Cited

U.S. PATENT DOCUMENTS

| 2020/0044273 A1* | 2/2020 | Abe | H01M 10/0468 |
| 2021/0265650 A1* | 8/2021 | Kim | H01M 10/0459 |

FOREIGN PATENT DOCUMENTS

KR      10-2728779 B1    11/2024

\* cited by examiner

*Primary Examiner* — Lingwen R Zeng
(74) *Attorney, Agent, or Firm* — Harness, Dickey & Pierce, P.L.C.

(57) ABSTRACT

Embodiments according to the present invention provide an apparatus for manufacturing a cell stack for a secondary battery having clamping unit, comprising: a stack table on which electrode plates and separators are alternately stacked; and clamping units installed on one side and the other side of the stack table respectively to press and hold the stacked electrode plates and separators continuously toward the stack table; wherein the clamping unit comprises a mandrel for pressing the stacked electrode plates and separators toward the stack table; a support bracket for supporting the mandrel so that it can be moved up and down; and an elastic support means for imparting an elastic restoring force to the mandrel toward the stack table.

5 Claims, 5 Drawing Sheets

APPARATUS FOR MANUFACTURING A CELL STACK FOR A SECONDARY BATTERY HAVING CLAMPING UNIT

FIELD

The present invention relates to an apparatus for manufacturing a cell stack for a secondary battery having clamping unit capable of stably pressing and holding electrode plates (negative electrode plates and positive electrode plates) loaded between separator together with the separator on a stack table without damage.

BACKGROUND

Secondary batteries are made up of a cell stack in which positive and negative plates are sequentially stacked with a separator in between, and the stack is immersed in an electrolyte. There are two main methods for manufacturing the cell stack of secondary batteries.

Low-capacity secondary batteries are often manufactured in the form of a jelly-roll by arranging negative and positive plates on separate separators and rolling them up, while medium- to large-capacity secondary batteries are often manufactured in the form of a cell stack in which negative and positive plates are stacked several times so that they are separated by a separator.

Among the methods of manufacturing cell stacks using a stacking method, there is a Z-stacking method, in which the separator is folded in a zigzag shape, and a cell stack is manufactured in which the negative electrode plates and positive electrode plates are alternately inserted between the folded separators.

At this time, the clamping unit presses the cell stack toward the stack table to prevent the manufactured cell stack from collapsing, and allows the separator to be folded in a zigzag shape.

The clamping unit is a set of two, and is installed on one side and the other side of the stack table. The clamping unit alternately moves up and down by the operation of the servo motor, and presses the electrode plate (negative plate or positive plate) loaded on the separator to the stack table side at the preset pressure position to hold it.

However, if the electrode plates being stacked are stacked lower than the preset pressing position due to the thickness deviation of the electrode plates, there is a problem that the clamping unit cannot pressurize the electrode plates.

This causes the stacked electrode plates to warp or the cell stack to collapse.

On the other hand, if the electrode plates being stacked are stacked higher than the preset pressing position due to the thickness deviation of the electrode plates, there is a problem that not only are the electrode plates pressed excessively, but also the electrode plates are damaged.

SUMMARY

Technical Problem

The present invention provides an apparatus for manufacturing a cell stack for a secondary battery having clamping unit capable of solving a problem of not being able to properly hold stacked electrode plates and a separator due to a thickness deviation of the electrode plates.

Technical Solution

Embodiments according to the present invention provide an apparatus for manufacturing a cell stack for a secondary battery having clamping unit, comprising: a stack table on which electrode plates and separators are alternately stacked; and clamping units installed on one side and the other side of the stack table respectively to press and hold the stacked electrode plates and separators continuously toward the stack table; wherein the clamping unit comprises a mandrel for pressing the stacked electrode plates and separators toward the stack table; a support bracket for supporting the mandrel so that it can be moved up and down; and an elastic support means for imparting an elastic restoring force to the mandrel toward the stack table.

In embodiments according to the present invention, the clamping units are provided in pairs, and each is installed on one side edge of both sides of the stack table and the other side edge of both sides of the stack table.

In embodiments according to the present invention, the support bracket is moved away from the stack table and raised and moved close to the stack table and lowered to a preset pressurizing position, so that the mandrel presses the stacked electrode plates and the separator.

In embodiments according to the present invention, an LM guide rail extending vertically in the up and down direction is installed on the support bracket, and an LM guide block slidably mounted on the LM guide rail is installed at the starting end of the mandrel.

In embodiments according to the present invention, the elastic support means is provided by a pneumatic cylinder, wherein the cylinder body of the pneumatic cylinder is fixedly installed on the support bracket, and the cylinder rod of the pneumatic cylinder is connected to the mandrel.

In embodiments according to the present invention, the pneumatic cylinder applies pneumatic pressure to the cylinder body to compress the cylinder rod so that the mandrel is positioned lower than the preset pressurizing position.

In embodiments according to the present invention, the air pressure applied to the cylinder body is lower than the pressure at which the support bracket lowers the mandrel to the preset pressurizing position.

In embodiments according to the present invention, the elastic support means is provided by a tensile coil spring, one end of the tensile coil spring is fixedly installed to the support bracket, and the other end of the tensile coil spring is connected to the mandrel.

In embodiments according to the present invention, the tensile coil spring has an equilibrium length such that the mandrel is positioned lower than the preset pressurizing position.

Advantageous Effects

According to the present invention, since the mandrel is elastically supported by the elastic support means, even if the electrode plates is stacked higher than the preset pressurizing position, the electrode plates can be stably pressed without damage.

According to the present invention, Since the mandrel is set lower than the preset pressurizing position by the elastic support means, the electrode plates can be stably held and pressed even if the electrode plate is stacked lower than the preset pressurizing position.

DETAILED DESCRIPTION

Hereinafter, Hereinafter, an apparatus for manufacturing a cell stack for a secondary battery having clamping unit according to embodiments of the present invention will be described in detail with reference to the drawings.

The terms used below have been selected for convenience of explanation, and should be appropriately interpreted in a meaning that is consistent with the technical idea of the present invention without being limited to the dictionary meaning.

Figure 1:
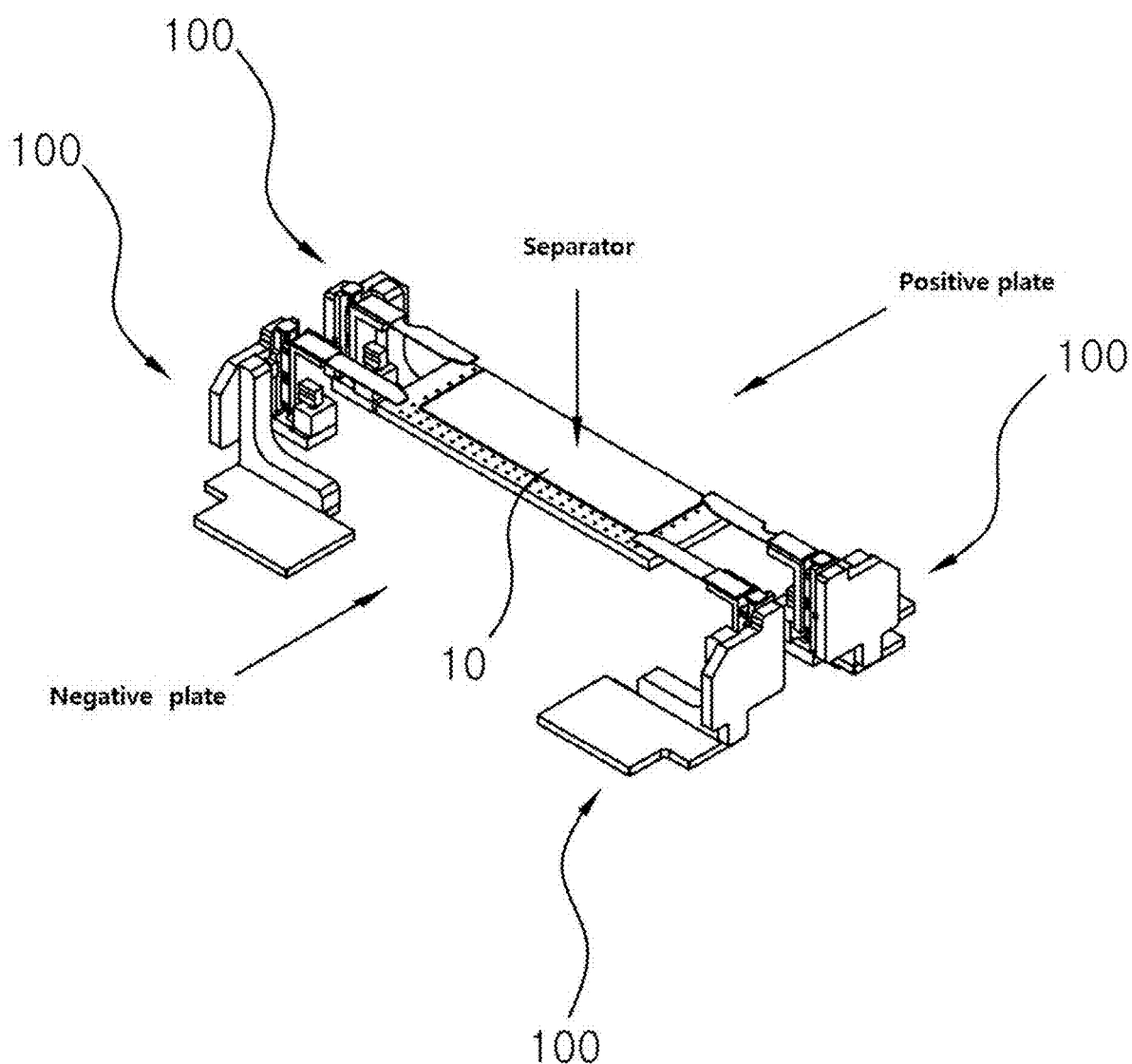
FIG. 1 is a drawing schematically showing the installation state of an apparatus for manufacturing a cell stack for a secondary battery having clamping unit according to the present invention.

FIG. 1 is a drawing schematically showing the installation state of an apparatus for manufacturing a cell stack for a secondary battery having clamping unit according to the present invention.

Referring to FIG. 1, an apparatus for manufacturing a cell stack for a secondary battery having a clamping unit according to the present embodiment comprises a stack table (10) and a clamping unit (100).

The stack table (10) is provided as a place where electrode plates and separator are alternately stacked.

As a specific example, the separator is supplied from the upper portion of the stack table (10), and the electrode plates (positive and negative plates) are supplied from each side of the stack table (10).

The stack table (10) may be a structure in which the electrode plates and separators are supplied and stacked while in a fixed state.

Alternatively, in order to receive the negative and positive plates, the stack table (10) may be rotated 45 degrees to one side and the other side, or may be moved horizontally.

Here, it is preferable to maintain the upper surface height of the stacked electrode plates and separator constant by sequentially lowering the stack table (10) in response to the total thickness of the electrode plates and separator being stacked.

The clamping unit (100) is installed on one side and the other side of the stack table (10), respectively, to continuously press and fix the stacked electrode plates and separator toward the stack table (10).

That is, the clamping unit (100) continuously holds the stacked electrode plates and separator by repeating the operation of pressing and releasing during the process of stacking the separator and electrode plates.

As a specific example, the clamping unit (100) is provided in pairs, and each pair is installed on both edges of one side among the two sides of the stack table (10) and both edges of the other side among the two sides of the stack table (10).

The clamping unit (100) comprises a mandrel (110), a support bracket (120), and an elastic support means (130).

The mandrel (110) is configured to press the stacked electrode plates and separator toward the stack table (10).

The mandrel (110) is coupled to the support bracket (120) and pressurizes the stacked electrode plates and separator in conjunction with the operation of the support bracket (120).

As a specific example, the support bracket (120) is moved away from the stack table (10) by a separate driving device and raised, approaches the stack table (10), and lowers to a preset pressurizing position so that the mandrel (110) pressurizes the stacked electrode plates and separator.

The present embodiment is characterized in that the mandrel (110) is coupled to the support bracket (120) so that it can move up and down. That is, the support bracket (120) supports the mandrel (100) so that it can move up and down.

In addition, the elastic support means (130) provides the mandrel (110) with an elastic restoring force toward the stack table (10). That is, a force (elastic force) is applied to the mandrel (110) toward the stack table (10) by the elastic support means (130), and the mandrel (110) can move up and down with respect to the support bracket (120).

By this structure, it is possible to solve a problem that occurs due to a thickness deviation of the electrode plates being stacked, that is, a problem in which the mandrel (110) does not grip the stacked electrode plates and separator, or a problem in which the mandrel (110) strongly presses the stacked electrode plates and separator, causing damage.

Meanwhile, in the present embodiment, the clamping units (100) can safely and elastically pressurize and hold the stacked electrode plates and separator even if the upper surface height of the stacked electrode plates and separator is lower or higher than the preset pressurizing position.

Figure 2:
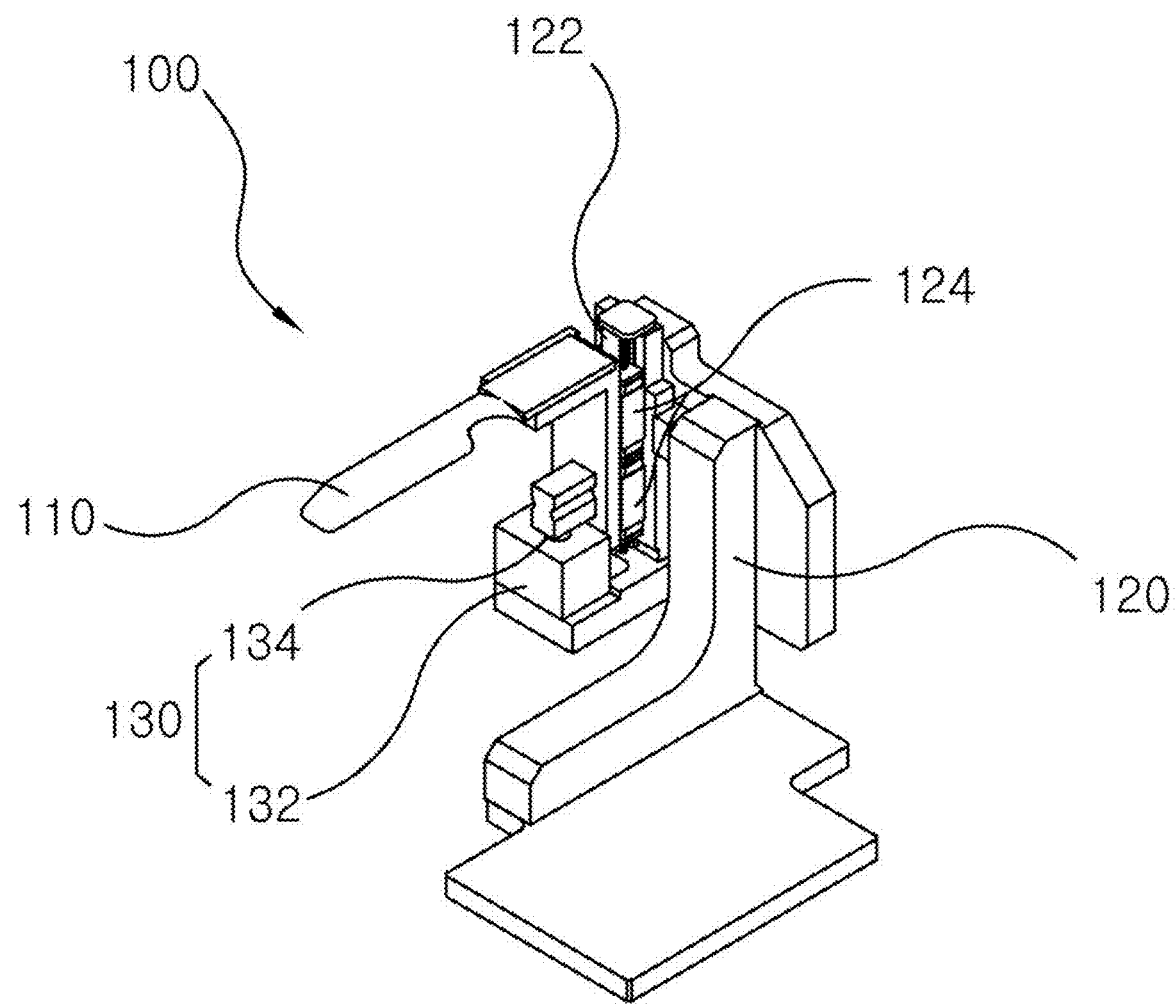
FIG. 2 is a drawing enlarged of one clamping unit according to the present invention illustrated in FIG. 1.

FIG. 2 is a drawing enlarged of one clamping unit according to the present invention illustrated in FIG. 1.

Referring to FIG. 2, the clamping unit (100) includes a mandrel (110), a support bracket (120), and an elastic support means (130).

The mandrel (110) presses the negative and positive plates supplied together with the separator to hold them on the stack table (10), and allows the separator to be folded in a zigzag shape.

The mandrel (110) is provided in a horizontal plate shape having a predetermined length.

At this time, the lower surface of the mandrel (110), that is, the lower surface that contacts and presses the negative and positive plates, is formed flat.

The support bracket (120) moves the mandrel (110) closer to or further away from the stack table (10) so that the mandrel (110) can press the negative and positive plates supplied to the separator at the preset pressurizing position, and at the same time raises and lowers the mandrel (110) to the preset pressurizing position.

Meanwhile, the support bracket (120) supports the mandrel (110) so that it can move up and down.

To this end, an LM guide rail (122) extending vertically in the up-and-down direction is installed on the support bracket (120).

And, at the starting end of the mandrel (110) facing the LM guide rail (122), an LM guide block (124) that is slidably mounted on the LM guide rail (122) is installed.

The starting end of the mandrel (110) is provided with a plate that is perpendicular to the horizontal plate shape that contacts and presses the negative plate and the positive plate.

That is, the mandrel (110) is movably supported on the support bracket (120) by the LM guide rail (122) and the LM guide block (124).

The elastic support means (130) elastically raises and lowers the mandrel (110) so that the mandrel (110) can pressurize the negative and positive plates supplied to the separator regardless of the preset pressurizing position.

Figure 3:
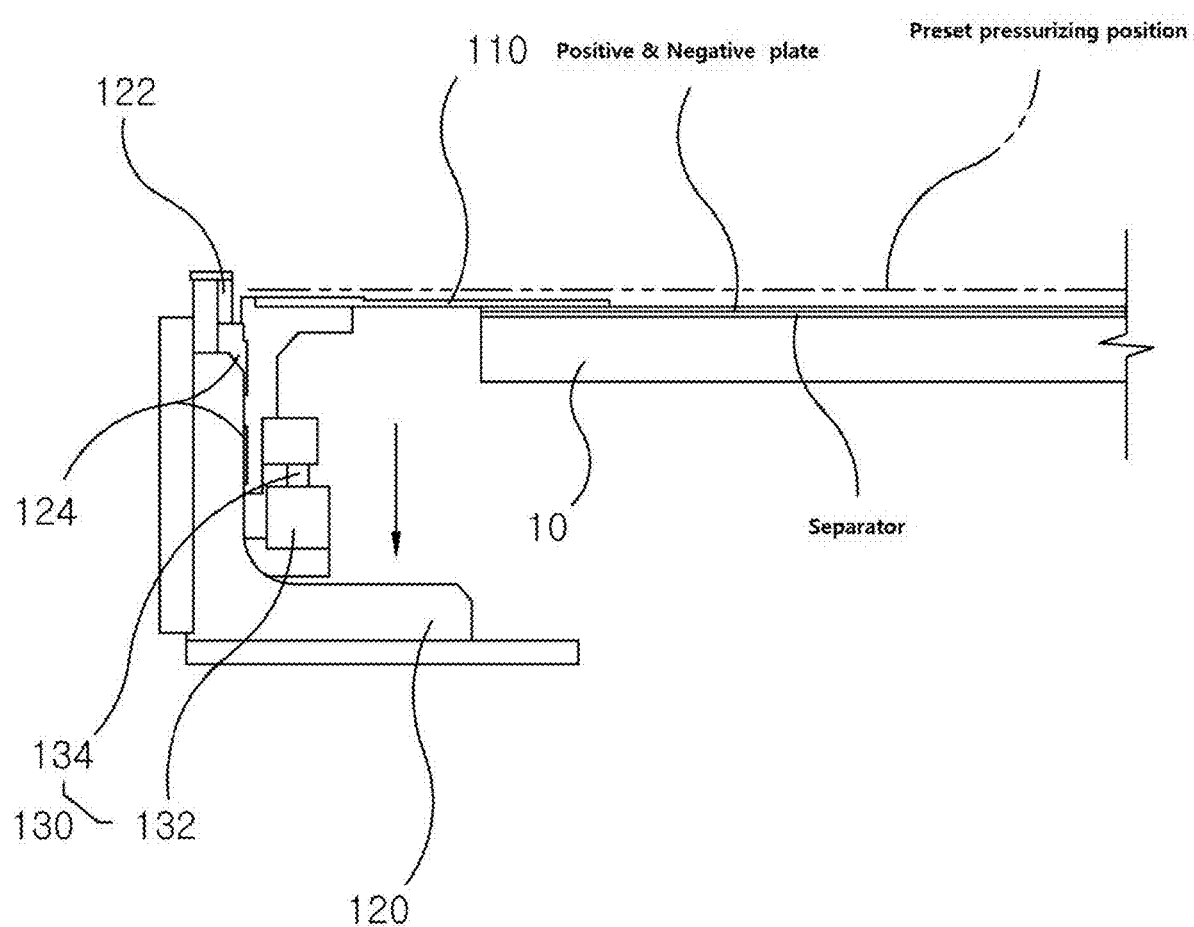
FIG. 3 and FIG. 4 are drawings schematically showing the operating state of an apparatus for manufacturing a cell stack for a secondary battery having clamping unit according to the present invention.
Figure 4:
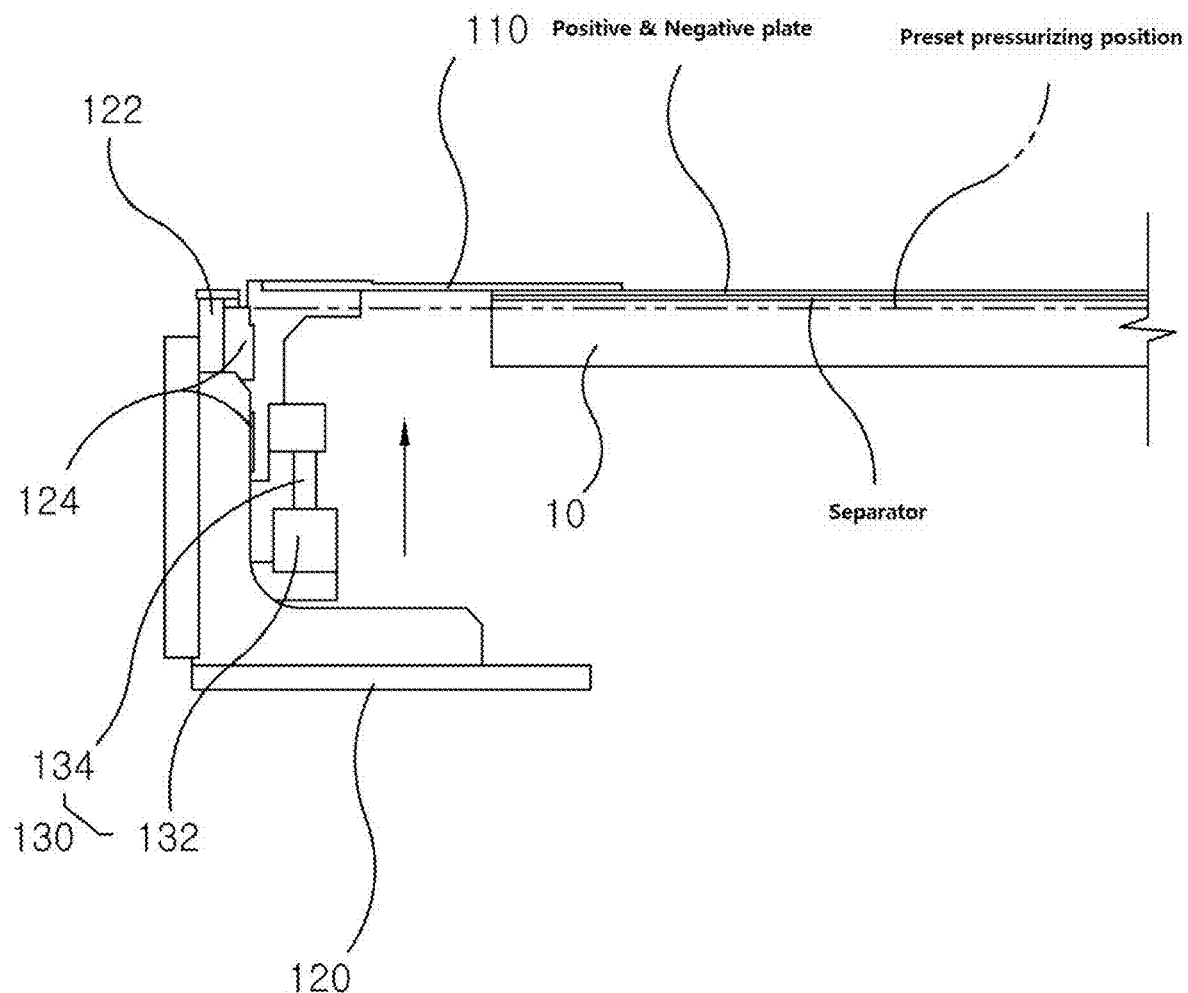

The elastic support means (130) is provided as a pneumatic cylinder as shown in FIGS. 2 to 4.

The cylinder body (132) of the pneumatic cylinder is fixedly installed on the support bracket (120) so as not to interfere with the LM guide rail (122) and the LM guide block (124), and the cylinder rod (134) of the pneumatic cylinder is connected to the starting end side of the mandrel (110) so as not to interfere with the LM guide block (124).

And the pneumatic cylinder applies pneumatic pressure to the cylinder body (132) so that the mandrel (110) connected to the cylinder rod (134) is positioned lower than the preset pressurizing position, thereby compressing the cylinder rod (134).

That is, since the mandrel (110) is set lower than the preset pressurizing position by the elastic support means (130), even if the negative and positive plates being stacked are stacked lower than the preset pressurizing position as shown in FIG. 3, the mandrel (110) can pressurize the negative and positive plates.

On the contrary, as shown in FIG. 4, when the negative and positive plates being stacked as shown in FIG. 4 are stacked higher than the preset pressurizing position, the cylinder rod (134) is extended as a counterforce to the force pressing the negative and positive plates being stacked by the support bracket (120), allowing the mandrel (110) to press the negative and positive plates without damage.

That is, the air pressure applied to the cylinder body (l32) is lower than the pressure at which the support bracket (120) lowers the mandrel (110) to the preset pressurizing position.

Figure 5:
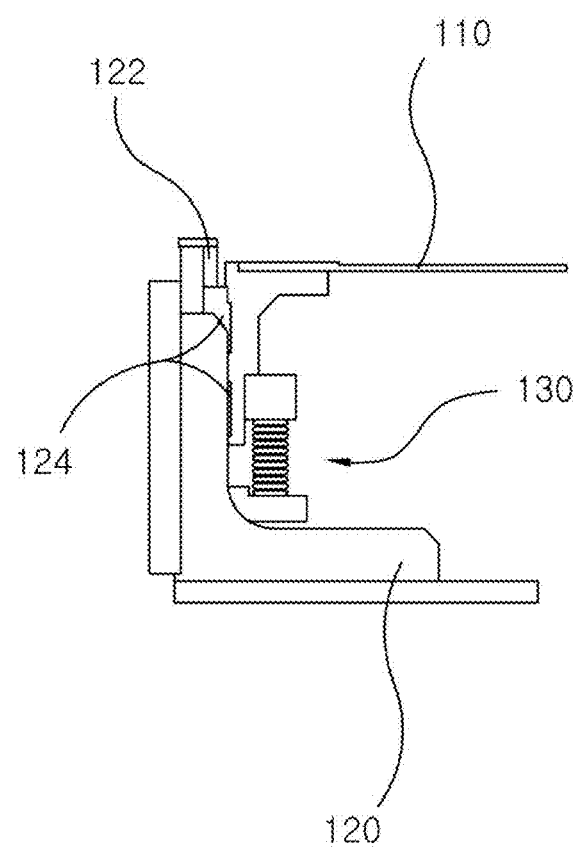
FIG. 5 is a drawing illustrating another embodiment of an apparatus for manufacturing a cell stack for a secondary battery having clamping unit according to the present invention.

Meanwhile, the elastic support means (130) may be provided as a tensile coil spring as shown in FIG. 5.

At this time, one end of the tensile coil spring is fixedly installed on the support bracket (120) so as not to interfere with the LM guide rail (122) and the LM guide block (124), and the other end of the tensile coil spring is connected to the starting end side of the mandrel (110) so as not to interfere with the LM guide block (124).

And the tensile coil spring has an equilibrium length that allows the mandrel (110) to be positioned lower than the preset pressurization position. The equilibrium length means the spring length when there is no external force.

As described above, according to the present invention, the clamping unit (100) enables the electrode plates to be pressed without damage even if the electrode plates are stacked higher than the preset pressurizing position because the mandrel (110) is elastically raised and lowered by the elastic support means (130).

In addition, the clamping unit (100) enables the electrode plates to be stably pressed even if the electrode plates are stacked lower than the preset pressurizing position because the mandrel (110) is set lower than the preset pressurizing position by the pressure of the elastic support means (130).

What is claimed is:

1. An apparatus for manufacturing a cell stack for a secondary battery having clamping unit, comprising:
    a stack table on which electrode plates and separators are alternately stacked; and
    clamping units installed on one side and the other side of the stack table respectively to press and hold the stacked electrode plates and separator continuously toward the stack table;
    wherein the clamping unit comprises
    a mandrel for pressing the stacked electrode plates and separators toward the stack table;
    a support bracket for supporting the mandrel so that it can be moved up and down; and
    an elastic support means for imparting an elastic restoring force to the mandrel toward the stack table,
    wherein an LM guide rail extending vertically in the up and down direction is installed on the support bracket, and an LM guide block slidably mounted on the LM guide rail is installed at the starting end of the mandrel,
    wherein the elastic support means is provided by a pneumatic cylinder, wherein the cylinder body of the pneumatic cylinder is fixedly installed on the support bracket, and the cylinder rod of the pneumatic cylinder is connected to the mandrel, and
    wherein the air pressure applied to the cylinder body is lower than the pressure at which the support bracket lowers the mandrel to the preset pressurizing position.

2. The apparatus of claim 1, wherein the clamping units are provided in pairs, and each is installed on one side edge of both sides of the stack table and the other side edge of both sides of the stack table.

3. The apparatus of claim 1, wherein the support bracket is moved away from the stack table and raised and moved close to the stack table and lowered to a preset pressurizing position, so that the mandrel presses the stacked electrode plates and the separator.

4. The apparatus of claim 1, wherein the pneumatic cylinder applies pneumatic pressure to the cylinder body to compress the cylinder rod so that the mandrel is positioned lower than the preset pressurizing position.

5. An apparatus for manufacturing a cell stack for a secondary battery having clamping unit, comprising:
    a stack table on which electrode plates and separators are alternately stacked; and
    clamping units installed on one side and the other side of the stack table respectively to press and hold the stacked electrode plates and separator continuously toward the stack table;
    wherein the clamping unit comprises
    a mandrel for pressing the stacked electrode plates and separators toward the stack table;
    a support bracket for supporting the mandrel so that it can be moved up and down; and
    an elastic support means for imparting an elastic restoring force to the mandrel toward the stack table,
    wherein an LM guide rail extending vertically in the up and down direction is installed on the support bracket, and an LM guide block slidably mounted on the LM guide rail is installed at the starting end of the mandrel,
    wherein the elastic support means is provided by a tensile coil spring, one end of the tensile coil spring is fixedly installed to the support bracket, and the other end of the tensile coil spring is connected to the mandrel, and
    wherein the tensile coil spring has an equilibrium length such that the mandrel is positioned lower than the preset pressurizing position.

* * * * *